US011079952B2

(12) United States Patent
Jang (10) Patent No.: US 11,079,952 B2
(45) Date of Patent: Aug. 3, 2021

(54) DATA STORAGE DEVICE PERFORMING SCAN OPERATIONS ON MEMORY REGIONS TO MOVE DATA AND OPERATION METHOD THEREOF

(71) Applicant: SK hynix Inc., Gyeonggi-do (KR)

(72) Inventor: Jae Yeon Jang, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 11 days.

(21) Appl. No.: 16/592,285

(22) Filed: Oct. 3, 2019

(65) Prior Publication Data
US 2020/0310647 A1 Oct. 1, 2020

(30) Foreign Application Priority Data
Mar. 28, 2019 (KR) .......................... 10-2019-0035536

(51) Int. Cl.
*G06F 3/06* (2006.01)
*G06F 11/10* (2006.01)
*G06F 12/0882* (2016.01)
*G06F 12/02* (2006.01)
*G06F 11/07* (2006.01)

(52) U.S. Cl.
CPC ............ *G06F 3/064* (2013.01); *G06F 3/0614* (2013.01); *G06F 3/0653* (2013.01); *G06F 3/0659* (2013.01); *G06F 3/0679* (2013.01); *G06F 11/076* (2013.01); *G06F 11/102* (2013.01); *G06F 12/0238* (2013.01); *G06F 12/0882* (2013.01)

(58) Field of Classification Search
None
See application file for complete search history.

(56) References Cited

U.S. PATENT DOCUMENTS

| 9,620,245 | B2* | 4/2017 | Yen | ..................... G06F 3/0679 |
| 2015/0339188 | A1* | 11/2015 | Hu | ...................... G06F 11/1072 |
| | | | | 714/704 |
| 2015/0355845 | A1* | 12/2015 | Lee | ...................... G06F 3/0616 |
| | | | | 711/103 |
| 2016/0124679 | A1* | 5/2016 | Huang | ................. G11C 16/349 |
| | | | | 711/103 |
| 2017/0075593 | A1* | 3/2017 | Kim | ...................... G06F 3/0616 |

(Continued)

FOREIGN PATENT DOCUMENTS

| KR | 1020090129624 | 12/2009 | |
| KR | 1020170130657 | 11/2017 | |
| WO | WO-2009044904 A2 * | 4/2009 | ............ G11C 16/349 |

*Primary Examiner* — Kevin Verbrugge
(74) *Attorney, Agent, or Firm* — IP & T Group LLP (57) ABSTRACT

A data storage device may include a storage including a plurality of memory blocks each composed of a plurality of pages and divided into a first region including some of the plurality of memory blocks and a second region including remaining memory blocks of the plurality of memory blocks; and a controller configured to control data input and output of the storage in response to a request of a host, determine whether to move data stored in a memory block of the first region by performing a first scan operation on the memory block of the first region, and determine whether to move data stored in at least one memory block of the second region by performing a second scan operation on the at least one memory block of the second region after the first scan operation is completed.

17 Claims, 6 Drawing Sheets

(56) References Cited

U.S. PATENT DOCUMENTS

2017/0177425 A1* 6/2017 Jei ..................... G06F 11/1072
2017/0262197 A1* 9/2017 Tan ..................... G06F 3/065
2019/0294358 A1* 9/2019 Suzuki ................. G06F 3/0611

* cited by examiner

DATA STORAGE DEVICE PERFORMING SCAN OPERATIONS ON MEMORY REGIONS TO MOVE DATA AND OPERATION METHOD THEREOF

CROSS-REFERENCE TO RELATED APPLICATION

The present application claims priority under 35 U.S.C. § 119(a) to Korean application number 10-2019-0035536, filed on Mar. 28, 2019, in the Korean Intellectual Property Office, which is incorporated herein by reference in its entirety.

BACKGROUND

1. Technical Field

Various embodiments generally relate to a semiconductor integrated apparatus, and more particularly, to a data storage device and an operation method thereof.

2. Related Art

A storage device is electrically connected to a host and performs a data input/output operation at a request of the host. The storage device may use various storage media to store data.

The storage device may include a device that stores data in a magnetic disk, such as a hard disk drive (HDD), and a device that stores data in a semiconductor memory apparatus, particularly, a nonvolatile memory, such as a solid state drive (SSD) or a memory card.

A storage medium using a flash memory has advantages such as large capacity, nonvolatility, low unit cost, low power consumption, and high data processing speed.

SUMMARY

In an embodiment, a data storage device may include: a storage including a plurality of memory blocks each composed of a plurality of pages and divided into a first region including some of the plurality of memory blocks and a second region including remaining memory blocks of the plurality of memory blocks; and a controller configured to control data input and output of the storage in response to a request of a host, determine whether to move data stored in a memory block of the first region by performing a first scan operation on the memory block of the first region, and determine whether to move data stored in at least one memory block of the second region by performing a second scan operation on the at least one memory block of the second region after the first scan operation is completed.

In an embodiment, an operation method of a data storage device, which includes a storage including a plurality of memory blocks each composed of a plurality of pages and divided into a first region including some of the plurality of memory blocks and a second region including remaining memory blocks and a controller configured to control data input/output of the storage in response to a request of a host, the operation method comprising: scanning, in a first scan operation, by the controller, a memory block of the first region; determining, in a first determination operation, by the controller, whether to move data stored in the memory block of the first region based on a result of the first scan operation; scanning, in a second scan operation, by the controller, at least one memory block of the second region; and determining, in a second determination operation, by the controller, whether to move data stored in the memory block of the second region based on a result of the second scan operation.

In an embodiment, a data storage device may include: a storage including first and second regions, the first region storing system data for an operation of a host; and a controller configured to control the storage to sequentially scan the first and second regions upon power-on of the data storage device; control the storage to perform a read reclaim operation on the first region when a cumulative read count of the first region is greater than a first threshold as a result of the scan of the first region; and control the storage to perform a read reclaim operation on the second region when a cumulative read count of the second region is greater than a second threshold as a result of the scan of the second region.

DETAILED DESCRIPTION

A data storage device and an operation method thereof is described below in more detail with reference to the accompanying drawings. Throughout the specification, reference to "an embodiment" or the like is not necessarily to only one embodiment, and different references to any such phrase are not necessarily to the same embodiment(s).

Figure 1:
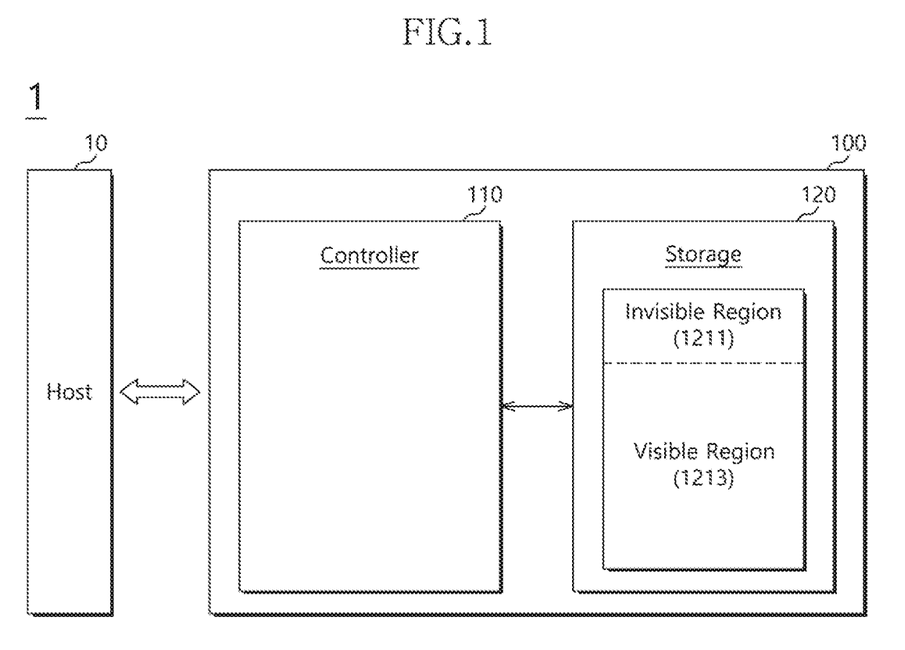
FIG. 1 is a diagram illustrating a configuration of an electronic apparatus including a data storage device in accordance with an embodiment.

FIG. 1 is a diagram illustrating a configuration of an electronic apparatus 1 including a data storage device in accordance with an embodiment.

Referring to FIG. 1, a data storage device 100 in accordance with an embodiment may include a controller 110 and a storage 120, and operate under the control of a host 10.

The controller 110 may control the storage 120 in response to a request of the host 10. For example, the controller 110 may direct data to be programmed in the storage 120 in response to a write request of the host. Furthermore, the controller 110 may provide the host with the data written in the storage 120 in response to a read request of the host.

The storage 120 may write data or output the written data under the control of the controller 110. The storage 120 may include a volatile or nonvolatile memory apparatus. In an embodiment, the storage 120 may be implemented using any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and/or a spin torque transfer magnetic RAM (STT-MRAM). The storage 120 may include a plurality of dies, a plurality of chips, or a plurality of packages. In addition, the storage 120 may include single-level cells, each of which stores one bit of data or multi-level cells, each of which stores multiple bits of data.

In an embodiment, the storage 120 may have a hierarchical structure of die(s), plane(s), block(s) and page(s). That is, each die may include at least one plane, which may include at least one block, which may include at least one page including a plurality of memory cells.

The storage 120 may include a system region 1211 that is invisible to, or inaccessible by, a user or the host, and a user region 1213 that is visible to, or accessible by, a user or the host. Each of the system region 1211 and the user region 1213 may include a plurality of blocks.

System data required for an operation of the host 10 may be stored in a set portion of the system region 1211 or the user region 1213, which portion may be predetermined.

Figure 2:
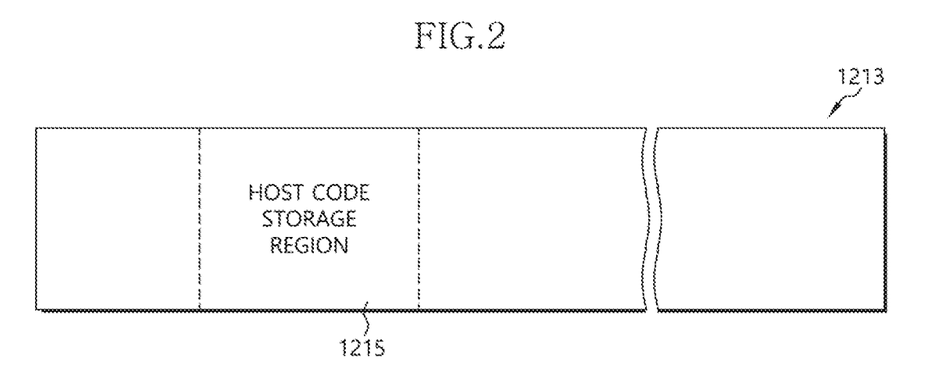
FIG. 2 is a diagram illustrating a configuration of a storage in accordance with an embodiment.

FIG. 2 is a diagram illustrating a configuration of the storage 120 in accordance with an embodiment.

Referring to FIG. 2, the system data required for the operation of the host 10 may be stored in a host code storage region 1215 of the user region 1213.

Power may be supplied to the electronic apparatus 1 under the control of a user, or after sudden power off (SPO), power may be re-supplied to the electronic apparatus 1.

As the power s supplied to the electronic apparatus 1, the data storage device 100 may receive the power and then may be booted and initialized. After the data storage device 100 becomes available, the host 10 may boot the electronic apparatus 1 by reading a code stored in the host code storage region 1215.

As described above, the host code storage region 1215 is read whenever power s applied to the electronic apparatus 1.

With an increase in the number of reads, represented by a cumulative read count, of the storage 120 configurable using a flash memory device, a threshold voltage level may be changed by a read disturb phenomenon. An uncorrectable error correction code (UECC) may be generated in data read from a cell where the read disturb has occurred.

Therefore, a management operation is required to move data of a region read more than a set number of times to another region.

Particularly, since the host code storage region 1215 is accessed for read whenever the electronic apparatus 1 is booted, the host code storage region 1215 is inevitably vulnerable to disturb.

The controller 110 according to embodiments of the present invention is configured to scan the storage 120 during an initialization operation after the data storage device 100 is booted. Then, the controller 110 may select a memory block, in which the number of reads has reached a set threshold value as a result of the scanning, as a memory block to be moved. The controller 110 may also perform a read reclaim operation of moving data of the selected memory block to another memory block at a specific timing after the initialization of the data storage device 100 is completed.

During an initialization operation for selecting the memory block to be moved, the controller 110 may preferentially scan a region that is frequently read, for example, the host code storage region 1215.

When the host code storage region 1215 is disturbed, the electronic apparatus 1 may not be booted. In order to prevent or minimize such a problem, the controller 110 performs a management operation for preventing or reducing the disturb of the host code storage region 1215. Then, the controller 110 may perform a management operation on a memory block, which may be disturbed due to a frequent read operation, by scanning the system region 1211 and the user region 1213 except for the host code storage region 1215, according to a set criterion.

Figure 3:
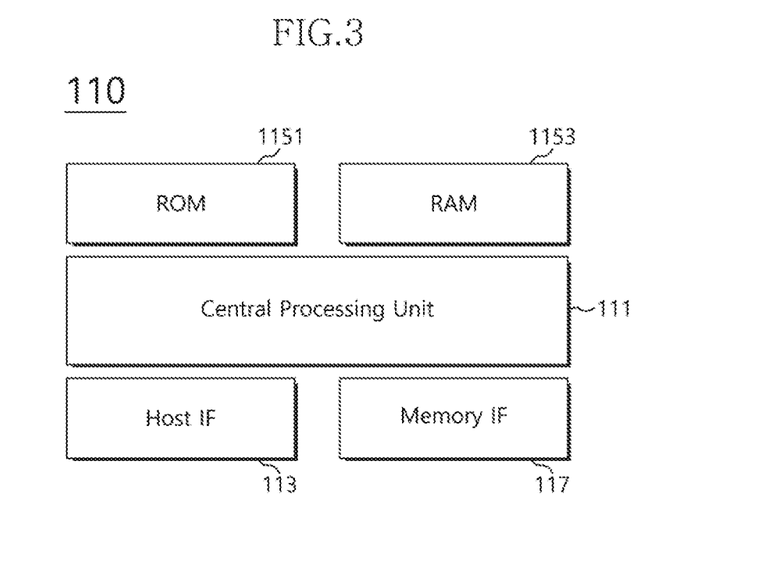
FIG. 3 is a diagram illustrating a configuration of a controller in accordance with an embodiment.

FIG. 3 is a diagram illustrating a configuration of the controller in accordance with an embodiment.

Referring to FIG. 3, the controller 110 may include a central processing unit 111, a host interface (IF) 113, a ROM 1151, a RAM 1153, and a memory interface (IF) 117.

The central processing unit 111 may be configured to transfer various types of control information for a data read or write operation for the storage 120 to the host IF 113, the RAM 1153, and the memory IF 117. In an embodiment, the central processing unit 111 may operate according to firmware provided for various operations of the data storage device 100. In an embodiment, the central processing unit 111 may perform a function of a flash translation layer (FTL) for performing address mapping, wear leveling or the like for managing the storage 120, a function of detecting and correcting an error of data read from the storage 120, or the like.

The host IF 113 may provide a communication channel for receiving a command and a clock signal from the host and controlling data input/output under the control of the central processing unit 111. The host IF 113 may provide a physical connection between the host and the data storage device 100. Furthermore, the host IF 113 may provide interfacing with the data storage device 100 in correspondence to a bus format of the host. The bus format of the host may include at least one of various standard interface protocols, such as a secure digital, a universal serial bus (USB), a multi-media card (MMC), an embedded MMC (eMMC), a personal computer memory card international association (PCMCIA), a parallel advanced technology attachment (PATA), a serial advanced technology attachment (SATA), a small computer system interface (SCSI), a serial attached SCSI (SAS), a peripheral component interconnection (PCI), a PCI express (PCI-E), and/or a universal flash storage (UFS).

The ROM 1151 may store program codes required for the operation of the controller 110, for example, firmware or software, and store code data or the like used by the program codes.

The RAM 1153 may store data for the operation of the controller 110 or data generated by the controller 110.

The memory IF 117 may provide a communication channel for signal transmission/reception between the controller 110 and the storage 120. The memory IF 117 may write data, which has been received through the host IF 113, in the storage 120 under the control of the central processing unit 111. Furthermore, the memory IF 117 may transfer data read from the storage 120 to the host IF 113.

As data stored in the storage 120 is repeatedly read, a disturb phenomenon may occur in the storage 120. The central processing unit 111 may move data of a memory block having an increased risk of disturb due to repeated read to another memory block. In order to select a memory block having a disturb risk, the central processing unit 111 may scan each of multiple memory blocks selected according to a set criterion from among memory blocks in the storage 120 and count the number of reads of each of the selected memory blocks during the booting and initialization operation of the electronic apparatus 1, primarily, the data storage device 100. Then, the central processing unit 111 may select a memory block, of which the cumulative read count has reached a set threshold value, as a memory block to be moved. The central processing unit 111 may perform a read reclaim operation of reading data from the selected memory block and writing the read data in another memory block.

In an embodiment, the central processing unit 111 may preferentially scan the host code storage region 1215 during the initialization operation and determine whether the host code storage region 1215 is a read reclaim target according to the number of reads of memory blocks therein. After scanning the host code storage region 1215, the central processing unit 111 may scan the system region 1211 and another portion of the user region 1213 according to a set criterion, and select a memory block to be a read reclaim target.

Accordingly, it is possible to prevent or minimize the host code storage region 1215, which is accessed in each booting operation of the electronic apparatus 1, from being disturbed.

Particularly, when sudden power off and power re-supply occur repeatedly, since it is necessary to access the host code storage region 1215 in order to reboot the electronic apparatus 1 whenever power is re-supplied, a memory block of a corresponding region may be vulnerable to disturb.

Therefore, when preferentially scanning the host code storage region 1215 and determining whether the host code storage region 1215 is a read reclaim target, codes required for booting the host 10 can be moved to a safe (reliable) memory block before the host code storage region 1215 is disturbed, so that it is possible to ensure the operation reliability of the electronic apparatus 1.

Figure 4:
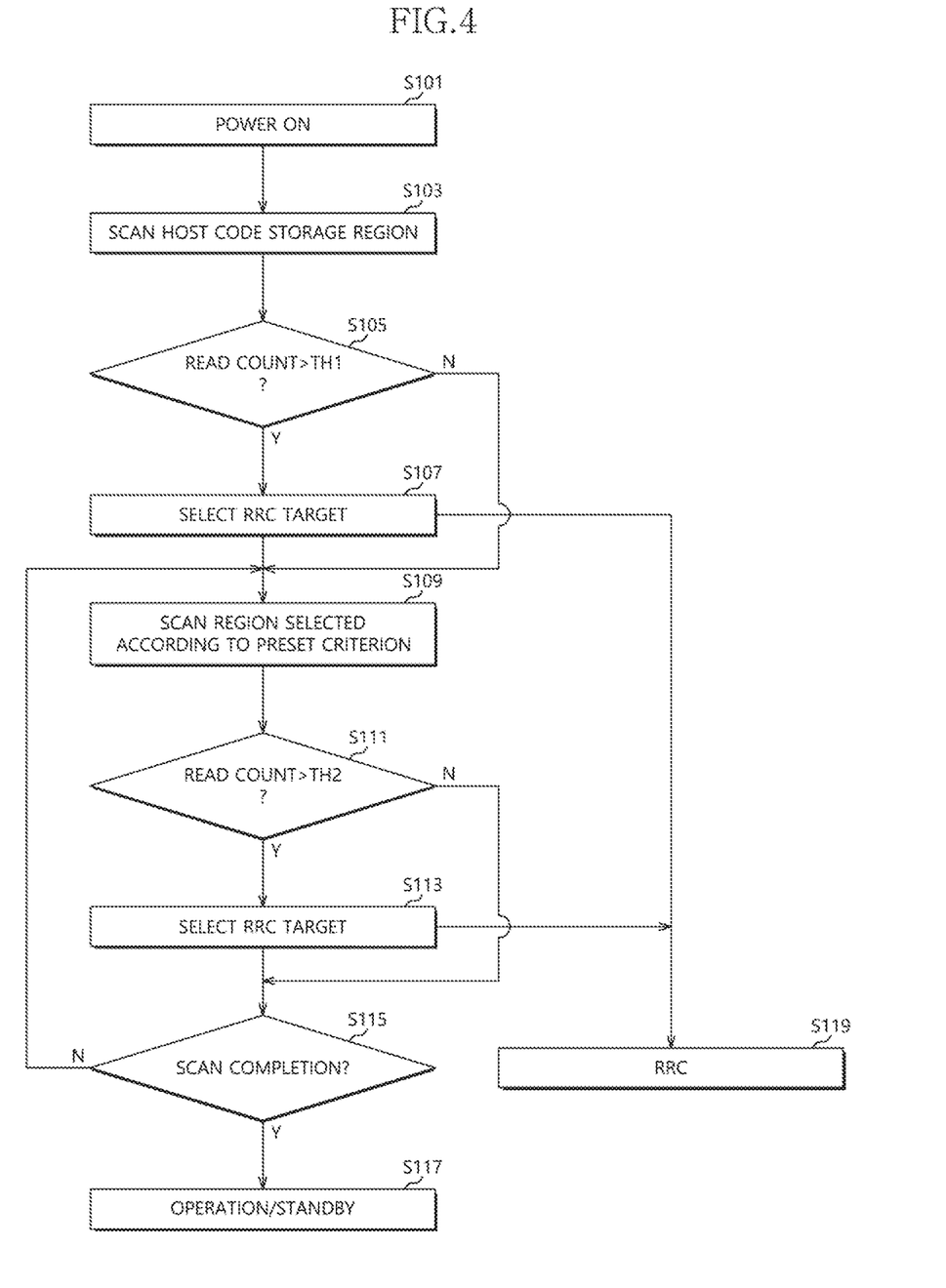
FIG. 4 is a flowchart illustrating an operation method of the data storage device in accordance with an embodiment.

FIG. 4 is a flowchart illustrating an operation method of the data storage device in accordance with an embodiment.

Referring to FIG. 4, when the electronic apparatus 1 is powered on (S101), the power is transferred from the host 10 to the data storage device 100, so that the data storage device 100 is booted to perform an initialization operation.

For the initialization operation, the controller 110 of the data storage device 100 may perform a first scan operation of preferentially scanning memory blocks of a first region, for example, the host code storage region 1215 and increasing a cumulative read count representing the sum of the read counts of all or some memory blocks in region 1215 (S103).

As a result of scanning the host code storage region 1215, the controller 110 may determine whether the cumulative read count for the host code storage region 1215 exceeds a set first threshold value TH1 (S105).

When the cumulative read count for the host code storage region 1215 exceeds the first threshold value TH1 (S105: Y), the controller 110 may select the host code storage region 1215 as a read reclaim ("RRC") target region (S107). In an embodiment, the controller 110 may determine whether to perform a read reclaim operation on the first region in consideration of a number of error bits detected from data read from the host code storage region 1215 in addition to the cumulative read count for the host code storage region 1215. When the read count does not exceed TH1 (S105:N), the controller 110 performs a second scan operation.

When the scan for the host code storage region 1215 is completed, the controller 110 may perform a second scan operation of scanning a second region, for example, at least one memory block of the user region 1213 other than the host code storage region 1215 (S109).

The second scan operation in step 5109 may be an operation of scanning one or more memory blocks selected according to a set criterion. In an embodiment, the controller 110 may select a plurality of memory blocks according to a round robin scheme, read a specified number of pages in each of the selected memory blocks, and increase a cumulative read count of the second region; however, the present invention is not limited thereto.

The controller 110 may determine whether the cumulative read count of the selected memory block(s) read according to the second scan operation exceeds a set second threshold value TH2 (S111). In an embodiment, the first threshold value TH1 and the second threshold value TH2 may be set to be equal to each other or different from each other.

When the cumulative read count of the selected memory block(s) accessed during the second scan operation exceeds the second threshold value TH2 (S111: Y), the controller 110 may select the selected memory block(s) read during the second scan operation as a read reclaim target region (S113). In an embodiment, the controller 110 may determine a read reclaim target in consideration of a number of error bits in data read from the selected memory block(s) accessed during the second scan operation in addition to the cumulative read count according to the second scan operation. When the read count does not exceed TH2 (S111:N), the controller 110 skips S113 and performs step S115, which is a step for checking whether the scan operation is complete.

When the scan for the memory block(s) selected from the second region according to the set criterion is completed (S115: Y), the data storage device 100 may be transitioned to a specific operation mode or a standby mode (S117). When the scan operation is not complete (S115:N), the controller performs step S109 to scans region selected according to set criterion.

The memory block(s) selected as the read reclaim target in steps S107 and S113 may be read-reclaimed at a specific timing (S119).

Then, the host 10 may boot the electronic apparatus 1 by reading program codes required for booting from the host code storage region 1215.

Consequently, it is possible to preferentially monitor the state of the host code storage region 1215 before the host code storage region 1215 is disturbed, so that it is possible to improve the operation reliability of the electronic apparatus 1.

Figure 5:
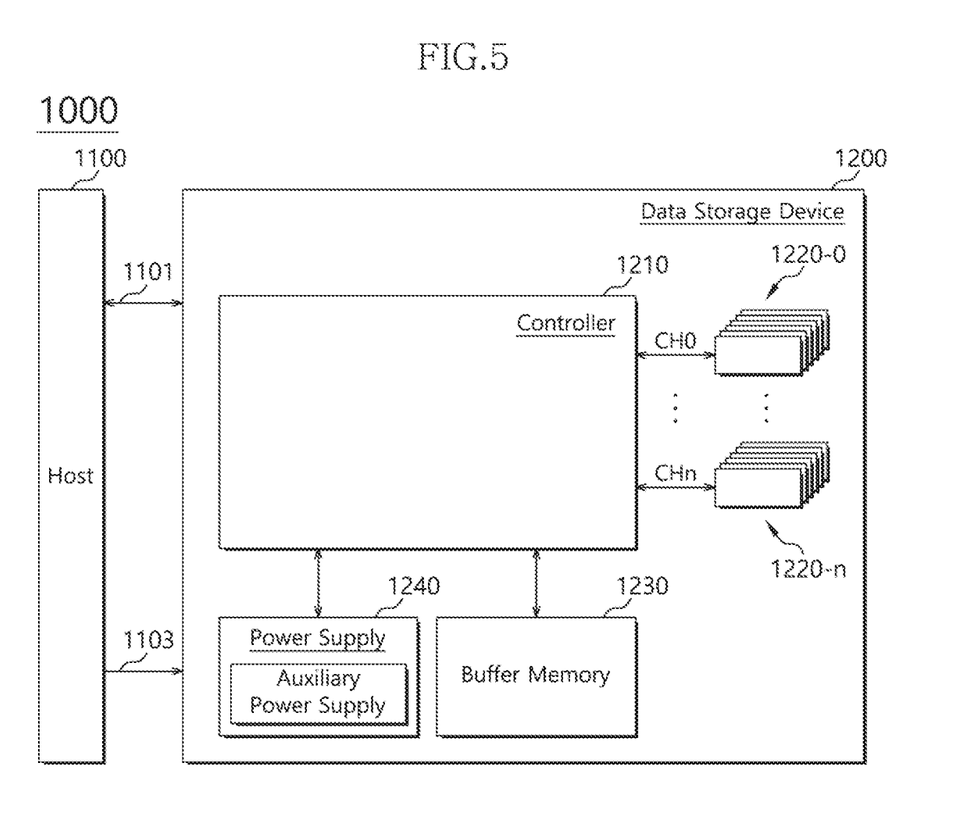
FIG. 5 is a diagram illustrating a data storage system in accordance with an embodiment.

FIG. 5 is a diagram illustrating a data storage system 1000, in accordance with an embodiment.

Referring to FIG. 5, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface, a control component, a random access memory used as a working memory, an error correction code (ECC) component, and a memory interface. In an embodiment, the controller 1210 may configured as controller 110 shown in FIGS. 1 and 3.

The host device 1100 may exchange a signal with the data storage device 1200 through the signal connector 1101. The signal may include a command, an address, data, and the like.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to the same channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be properly terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 6:
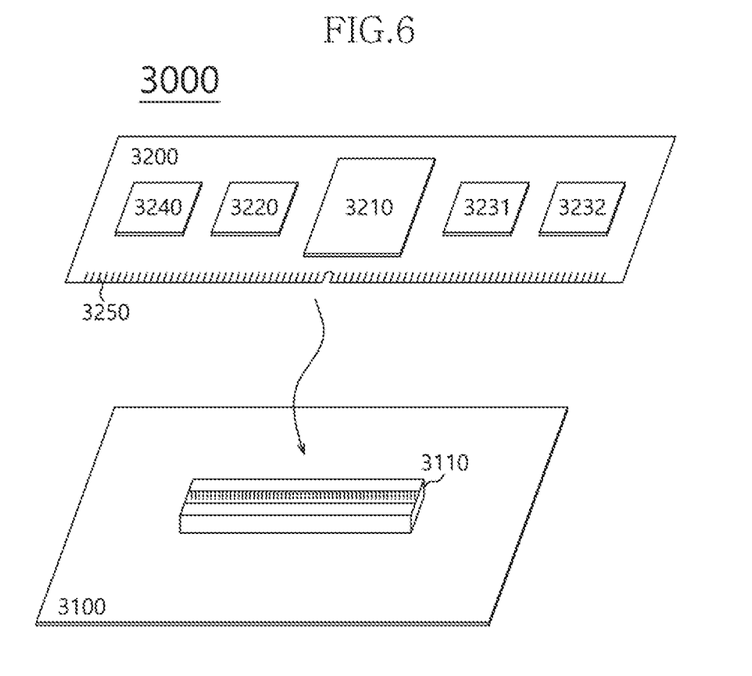
FIG. 6 and FIG. 7 are diagrams illustrating a data processing system in accordance with an embodiment.

FIG. 6 is a diagram illustrating a data processing system 3000, in accordance with an embodiment. Referring to FIG. 6, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and the like, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 7:
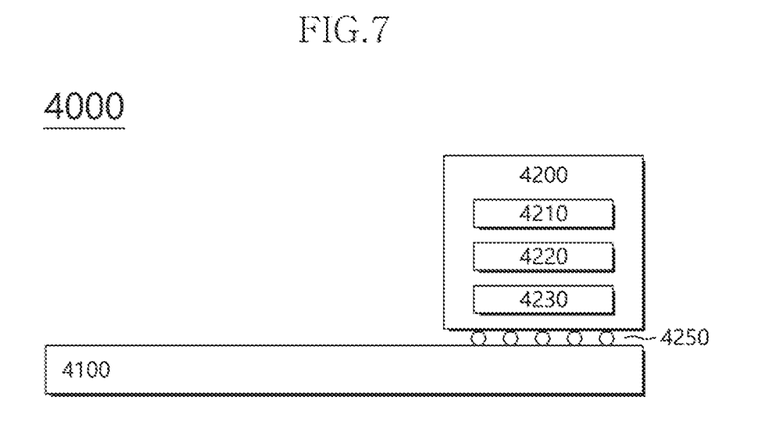

FIG. 7 is a diagram illustrating a data processing system 4000 in accordance with an embodiment. Referring to FIG. 7, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 8:
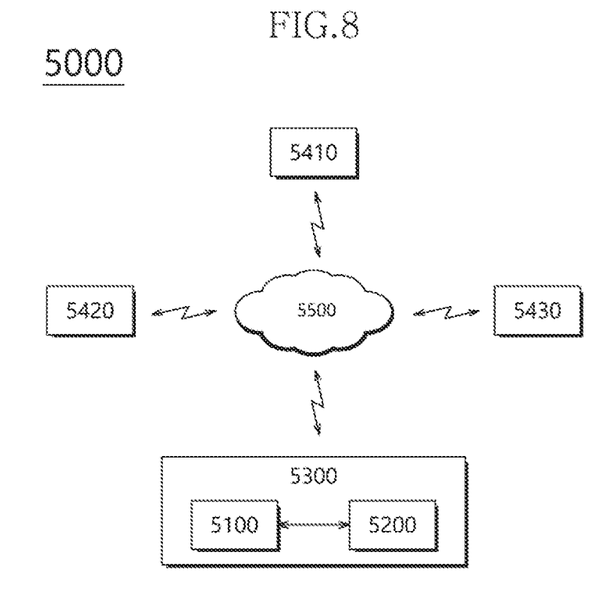
FIG. 8 is a diagram illustrating a network system including a data storage device in accordance with an embodiment.

FIG. 8 is a diagram illustrating a network system 5000 including a data storage device, in accordance with an embodiment. Referring to FIG. 8, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 5, the memory system 3200 shown in FIG. 6, or the memory system 4200 shown in FIG. 7.

Figure 9:
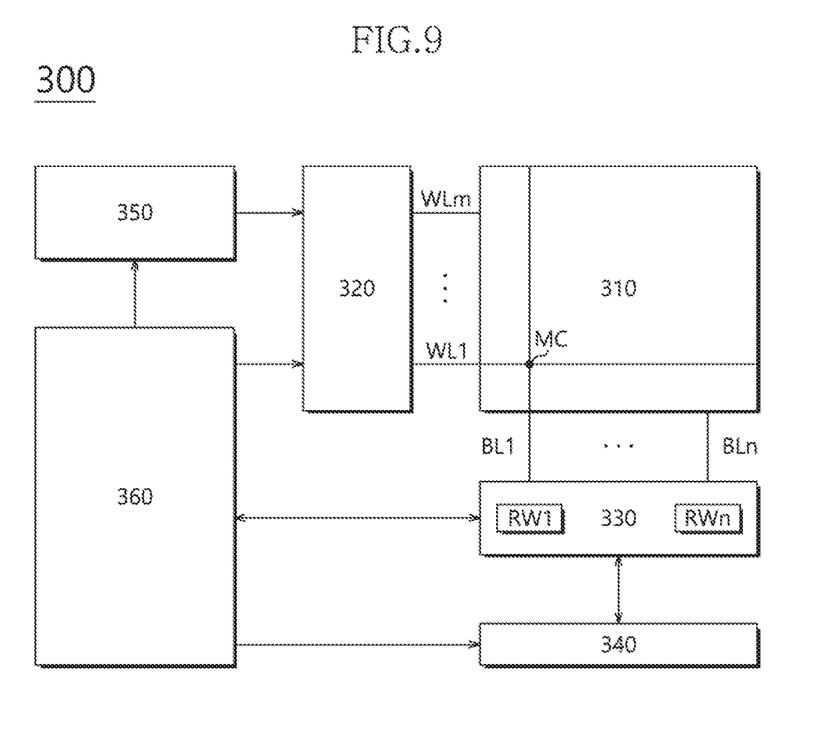
FIG. 9 is a block diagram illustrating a nonvolatile memory device included in a data storage device in accordance with an embodiment.

FIG. 9 is a block diagram illustrating a nonvolatile memory device 300 included in a data storage device, such as the data storage device 10, in accordance with an embodiment. Referring to FIG. 9, the nonvolatile memory device 300 may include a memory cell array 310, a row decoder 320, a data read/write block 330, a column decoder 340, a voltage generator 350, and control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure extending in a perpendicular direction to the flat surface of a semiconductor substrate. Moreover, the three-dimensional memory array means a structure including NAND strings of which memory cells are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged parallel and perpendicular to the surface of the semiconductor substrate. The memory cells may be variously spaced to provide different degrees of integration.

The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

While various embodiments have been illustrated and described, it will be understood to those skilled in the art in light of the present disclosure that the embodiments described are examples only. Accordingly, the present invention is not limited to or by the described embodiments. Rather, the present invention encompasses all modifications and variations of such embodiments that fall within the scope of the claims and their equivalents.

What is claimed is:

1. A data storage device comprising:
a storage including a plurality of memory blocks each composed of a plurality of pages and divided into a first region including some of the plurality of memory blocks and a second region including remaining memory blocks of the plurality of memory blocks; and
a controller configured to:
control data input and output of the storage in response to a request of a host,
determine whether to move data stored in a memory block of the first region by performing a first scan operation on the memory block of the first region, and
determine whether to move data stored in at least one memory block of the second region by performing a second scan operation on the at least one memory block of the second region after the first scan operation is completed,
wherein the controller is configured to preferentially scan the first region than the second region.

2. The data storage device according to claim 1, wherein the first region includes a memory block where system data for an operation of the host is stored, among the plurality of memory blocks.

3. The data storage device according to claim 1,
wherein, in the first scan operation, the controller reads data stored in the memory block of the first region,
wherein the controller is further configured to increase a cumulative read count of the memory block of the first region after the memory block of the first region is read, and
wherein the controller determines whether to move the data stored in the memory block of the first region by comparing the cumulative read count with a first threshold value.

4. The data storage device according to claim 3, wherein the controller is configured to determine whether to move the data stored in the memory block of the first region based on a number of error bits in the data read in the read operation.

5. The data storage device according to claim 1,
wherein, in the second scan operation, the controller selects some of the memory blocks of the second region, selects a specified number of pages from a plurality of pages of the selected memory blocks, and reads data stored in the selected pages, and
wherein the controller is further configured to increase a cumulative read count corresponding to the selected memory blocks.

6. The data storage device according to claim 5, wherein the controller determines whether to move the data stored in the selected memory blocks of the second region based on the cumulative read count of the selected memory blocks.

7. The data storage device according to claim 6, wherein the controller is configured to determine whether to move the data stored in the selected memory blocks of the second region further based on a number of error bits in the data read in the read operation.

8. An operation method of a data storage device including a storage including a plurality of memory blocks each composed of a plurality of pages and divided into a first region including some of the plurality of memory blocks and a second region including remaining memory blocks and a controller configured to control data input/output of the storage in response to a request of a host, the operation method comprising:
- scanning, in a first scan operation, by the controller, a memory block of the first region;
- determining, in a first determination operation, by the controller, whether to move data stored in the memory block of the first region based on a result of the first scan operation;
- scanning, in a second scan operation, by the controller, at least one memory block of the second region; and
- determining, in a second determination operation, by the controller, whether to move data stored in the memory block of the second region based on a result of the second scan operation,
- wherein the controller is configured to preferentially scan the first region than the second region.

9. The operation method according to claim 8, wherein the first region includes a region where system data for an operation of the host is stored.

10. The operation method according to claim 8,
wherein the first scan operation comprises reading, by the controller, data stored in the memory block of the first region and increasing a cumulative read count corresponding to the memory block of the first region, and
wherein the first determination operation comprises determining whether to move the data stored in the memory block of the first region by comparing the cumulative read count with a first threshold value.

11. The operation method according to claim 10, wherein the first determination operation further comprises:
- detecting, by the controller, a number of error bits in the data read in the first scan operation; and
- determining whether to move the data stored in the first region further based on the number of error bits.

12. The operation method according to claim 8, wherein the second scan operation comprises:
- selecting some of the memory blocks of the second region;
- selecting a specified number of pages from the plurality of pages of the selected memory blocks;
- reading data stored in the selected pages; and
- increasing a read count corresponding to the selected memory blocks.

13. The operation method according to claim 12, wherein the second determination operation comprises determining, by the controller, whether to move the data stored in the selected memory blocks of the second region based on the cumulative read count of the selected memory blocks.

14. The operation method according to claim 13, wherein the second determination step further comprises:
- detecting, by the controller, a number of error bits in the data read in the second scan operation; and
- determining whether to move the data stored in the selected memory blocks of the second region further based on the number of error bits.

15. A data storage device comprising:
a storage including first and second regions, the first region storing system data for an operation of a host; and
a controller configured to:
control the storage to sequentially scan the first and second regions upon power-on of the data storage device;
control the storage to perform a read reclaim operation on the first region when a cumulative read count of the first region is greater than a first threshold as a result of the scan of the first region; and
control the storage to perform a read reclaim operation on the second region when a cumulative read count of the second region is greater than a second threshold as a result of the scan of the second region,
wherein the controller is configured to preferentially scan the first region than the second region.

16. The data storage device according to claim 15, wherein the controller is configured to determine whether to perform the read reclaim operation of the first region further based on a number of error bits in the data read from the first region.

17. The data storage device according to claim 15, wherein the controller is configured to determine whether to perform the read reclaim operation of the second region further based on a number of error bits in the data read from the second region.

* * * * *